United States Patent
Propheter-Hinckley et al.

(10) Patent No.: US 9,803,500 B2
(45) Date of Patent: Oct. 31, 2017

(54) GAS TURBINE ENGINE AIRFOIL COOLING PASSAGE CONFIGURATION

(71) Applicant: United Technologies Corporation, Hartford, CT (US)

(72) Inventors: Tracy A. Propheter-Hinckley, Manchester, CT (US); San Quach, East Hartford, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 283 days.

(21) Appl. No.: 14/696,627

(22) Filed: Apr. 27, 2015

(65) Prior Publication Data

US 2015/0315929 A1 Nov. 5, 2015

Related U.S. Application Data

(60) Provisional application No. 61/988,452, filed on May 5, 2014.

(51) Int. Cl.
*F01D 5/18* (2006.01)
*F01D 25/12* (2006.01)

(52) U.S. Cl.
CPC ............. *F01D 25/12* (2013.01); *F01D 5/187* (2013.01); *F05D 2220/32* (2013.01); *F05D 2260/22141* (2013.01); *Y02T 50/676* (2013.01)

(58) Field of Classification Search
None
See application file for complete search history.

(56) References Cited

U.S. PATENT DOCUMENTS

| | | | | |
|---|---|---|---|---|
| 3,628,885 A | * | 12/1971 | Sidenstick | F01D 5/189 416/193 A |
| 4,073,599 A | * | 2/1978 | Allen | F01D 5/187 416/232 |

(Continued)

FOREIGN PATENT DOCUMENTS

JP S60198305 10/1985

OTHER PUBLICATIONS

Extended European Search Report for European Application No. 15166448.9 dated Sep. 1, 2015.

*Primary Examiner* — Nathaniel Wiehe
*Assistant Examiner* — Theodore Ribadeneyra
(74) *Attorney, Agent, or Firm* — Carlson, Gaskey & Olds, P.C.

(57) ABSTRACT

An airfoil for a gas turbine engine includes an airfoil body that extends in a radial direction from a support. The airfoil body has pressure and suction side walls joined at leading and trailing edges to provide an exterior airfoil surface. A chord-wise direction extends between the leading and trailing edges and a thickness direction transverse to chord-wise direction and extending between the pressure and suction side walls. Cooling passages extend from the support into the airfoil body. The cooling passages include adjacent passageways in the thickness direction and are separated by a chord-wise wall. One of the adjacent passageways is adjacent to another passageway in the chord-wise direction and is separated by a rib in the thickness direction. The rib is discontinued at a location along the radial direction to provide an opening that fluidly connects one of the adjacent passageways to the other passageway.

20 Claims, 5 Drawing Sheets

(56) References Cited

U.S. PATENT DOCUMENTS

| | | | |
|---|---|---|---|
| 5,356,265 A | 10/1994 | Kercher | |
| 6,079,946 A * | 6/2000 | Suenaga | F01D 5/187 415/114 |
| 6,139,269 A | 10/2000 | Liang | |
| 6,340,047 B1 * | 1/2002 | Frey | B22C 21/14 164/122.1 |
| 6,402,471 B1 | 6/2002 | Demers et al. | |
| 6,481,967 B2 * | 11/2002 | Tomita | F01D 5/186 415/115 |
| 7,413,407 B2 | 8/2008 | Liang | |
| 7,690,894 B1 * | 4/2010 | Liang | F01D 5/186 415/115 |
| 7,837,441 B2 * | 11/2010 | Spangler | F01D 5/186 415/115 |
| 8,105,031 B2 * | 1/2012 | Trindade | F01D 5/186 416/97 R |
| 8,613,597 B1 | 12/2013 | Liang | |
| 9,121,291 B2 * | 9/2015 | Hada | F01D 5/187 |
| 2007/0116570 A1 | 5/2007 | Boury | |

\* cited by examiner

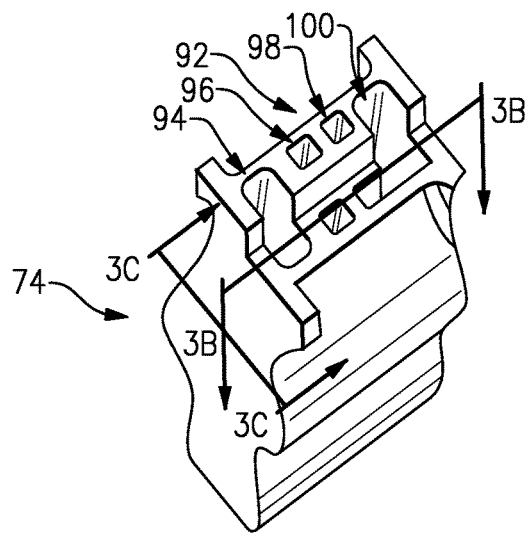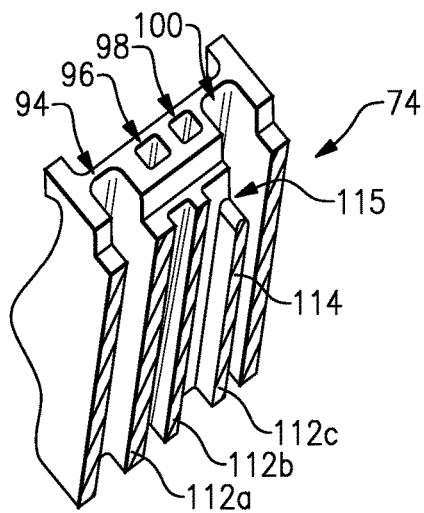
FIG.3A　　　　　　FIG.3B
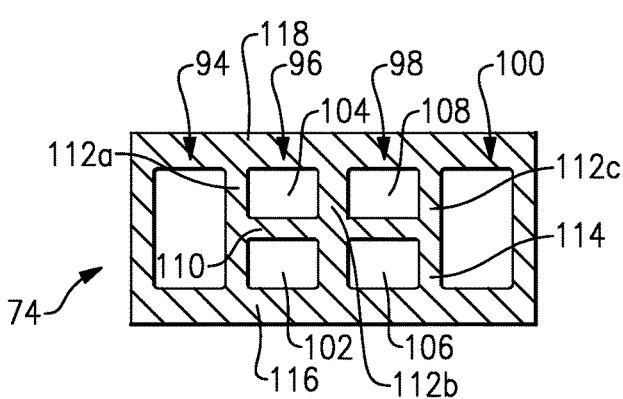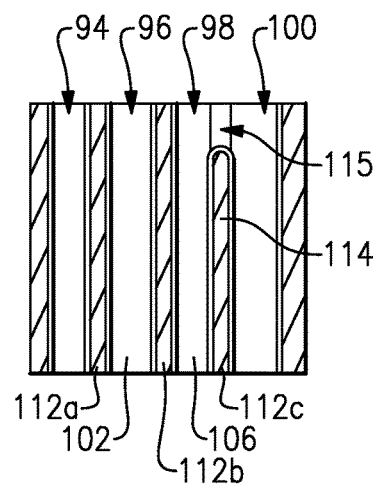
FIG.3C　　　　　　FIG.3D
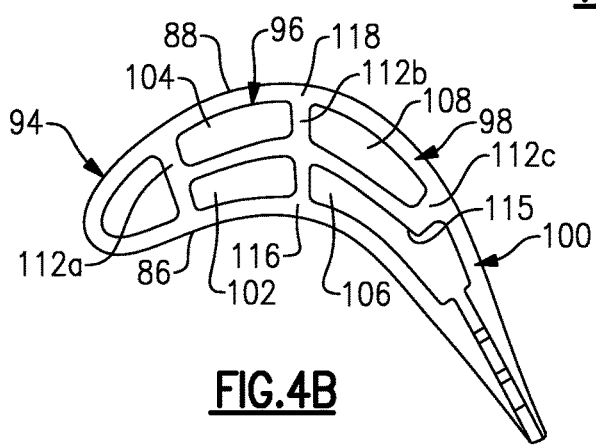
FIG.4B

GAS TURBINE ENGINE AIRFOIL COOLING PASSAGE CONFIGURATION

CROSS-REFERENCE TO RELATED APPLICATIONS

This application claims priority to U.S. Provisional Application No. 61/988,452, which was filed on May 5, 2014 and is incorporated herein by reference.

STATEMENT REGARDING FEDERALLY SPONSORED RESEARCH OR DEVELOPMENT

This invention was made with government support under Contract No. N00019-12-D-0002-4Y01, awarded by the Navy. The Government has certain rights in this invention.

BACKGROUND

This disclosure relates to a cooling passage configuration for a gas turbine engine airfoil.

A gas turbine engine typically includes a fan section, a compressor section, a combustor section and a turbine section. Air entering the compressor section is compressed and delivered into the combustor section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

Many blades and vanes include internal cooling passages that extend radially. The cooling passage may structurally weaken the blade. For some turbine blade applications, ribs are used in the cooling passage to strengthen the blade. In one example, these ribs transverse the entire span of the blade between the pressure and suction sides all the way from the root of the blade to its tip. Multiple layered cores result in half width feed cavities in the root of the part which greatly reduce the amount of air available to any given airfoil cavity.

In non-layered cores, one typical solution to increase the amount of flow to a given airfoil cavity without eliminating the ribs entirely from the blade is to place a "riblet" in the root of the core only. This "riblet" is a rib that stops within the root or neck of the blade and does not continue to the airfoil. The height of these ribs is dictated by the stresses in the root. Adjacent cooling passageways remain discrete and fluidly separated from one another.

SUMMARY

In one exemplary embodiment, an airfoil for a gas turbine engine includes an airfoil body that extends in a radial direction from a support. The airfoil body has pressure and suction side walls joined at leading and trailing edges to provide an exterior airfoil surface. A chord-wise direction extends between the leading and trailing edges and a thickness direction transverse to chord-wise direction and extending between the pressure and suction side walls. Cooling passages extend from the support into the airfoil body. The cooling passages include adjacent passageways in the thickness direction and are separated by a chord-wise wall. One of the adjacent passageways is adjacent to another passageway in the chord-wise direction and is separated by a rib in the thickness direction. The rib is discontinued at a location along the radial direction to provide an opening that fluidly connects one of the adjacent passageways to the other passageway.

In a further embodiment of the above, the airfoil is a blade and the support is a root.

In a further embodiment of any of the above, the location is within the root.

In a further embodiment of any of the above, the location is within the airfoil body.

In a further embodiment of any of the above, a platform is provided between the root and the airfoil body. The location is provided on a side of the platform opposite the airfoil body.

In a further embodiment of any of the above, the root includes a fir tree that is connected to the platform by a neck. The location is provided in the neck.

In a further embodiment of any of the above, the cooling passages include a leading edge passageway, a trailing edge passageway, and multiple intermediate passageways that are arranged between the leading and trailing edge passageways in the chord-wise directions.

In a further embodiment of any of the above, the other passageway is the trailing edge passageway.

In a further embodiment of any of the above, one of the adjacent passageways adjoins the pressure side wall.

In a further embodiment of any of the above, the intermediate passageways include at least two passageways. Multiple ribs extend in the thickness direction between the pressure and suction side walls to separate at least two passageways.

In another exemplary embodiment, a gas turbine engine includes compressor and turbine sections. An airfoil is in one of the compressor and turbine sections. The airfoil extends in a radial direction from a support. The airfoil body has pressure and suction side walls joined at leading and trailing edges to provide an exterior airfoil surface. A chord-wise direction extends between the leading and trailing edges. A thickness direction is transverse to the chord-wise direction and extends between the pressure and suction side walls. Cooling passages extend from the support into the airfoil body. The cooling passages include adjacent passageways in the thickness direction and are separated by a chord-wise wall. One of the adjacent passageways is adjacent to another passageway in the chord-wise direction and is separated by a rib in the thickness direction. The rib is discontinued at a location along the radial direction to provide an opening that fluidly connects one of the adjacent passageways to the other passageway.

In a further embodiment of the above, the airfoil is a turbine blade and the support is a root.

In a further embodiment of any of the above, the location is within the root.

In a further embodiment of any of the above, the location is within the airfoil body.

In a further embodiment of any of the above, a platform is provided between the root and the airfoil body. The location is provided on a side of the platform opposite the airfoil body.

In a further embodiment of any of the above, the root includes a fir tree connected to the platform by a neck. The location is provided in the neck.

In a further embodiment of any of the above, the cooling passages include a leading edge passageway, a trailing edge passageway, and multiple intermediate passageways arranged between the leading and trailing edge passageways in the chord-wise directions.

In a further embodiment of any of the above, the other passageway is the trailing edge passageway.

In a further embodiment of any of the above, one of the adjacent passageways adjoins the pressure side wall.

In a further embodiment of any of the above, the intermediate passageways include at least two passageways. Multiple ribs extend in the thickness direction between the pressure and suction side walls to separate at least two passageways.

BRIEF DESCRIPTION OF THE DRAWINGS

The disclosure can be further understood by reference to the following detailed description when considered in connection with the accompanying drawings wherein:

FIG. 3A is a cross-sectional view of the blade shown in FIG. 2A along the dashed line.

FIG. 3B is a cross-sectional view taken along Line 3B-3B of FIG. 3A.

FIG. 3C is a cross-sectional view taken along Line 3C-3C of FIG. 3A.

FIG. 3D is a side view of the cross-section shown in FIG. 3B.

FIG. 4B is a cross-sectional view taken along Line 4B-4B of FIG. 4A.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
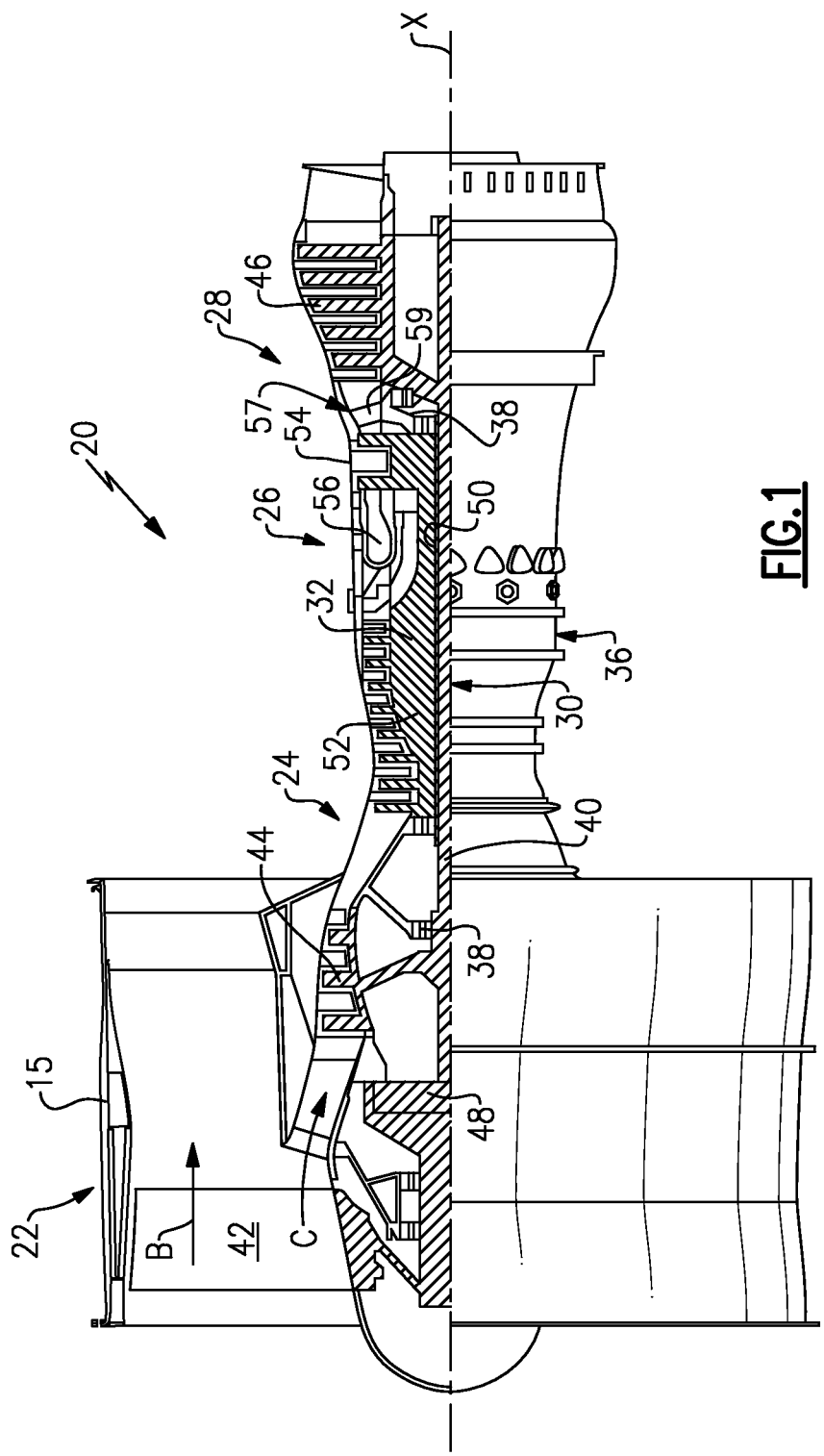
FIG. 1 schematically illustrates a gas turbine engine embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis X relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis X which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram }°\text{R})/(518.7°\text{R})]^{0.5}$. The "Low corrected fan tip speed" as disclosed herein according to one non-limiting embodiment is less than about 1150 ft/second (350.5 meters/second).

The disclosed cooling passages may be used in various gas turbine engine components. For exemplary purposes, a turbine blade 64 is described. It should be understood that the cooling passage may also be used in vanes, for example. The airfoil and associated cooling passages may be manufactured in any suitable manner.

Figure 2A:
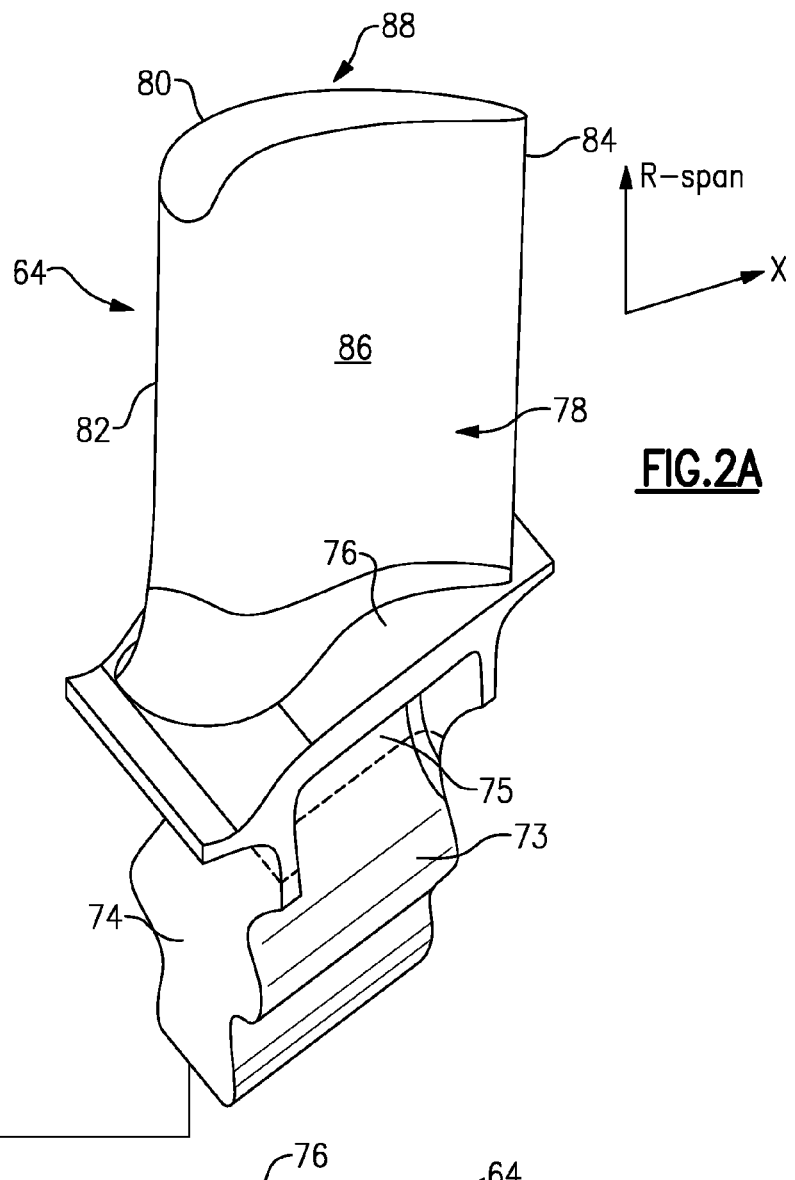
FIG. 2A is a perspective view of an example blade.
Figure 2B:
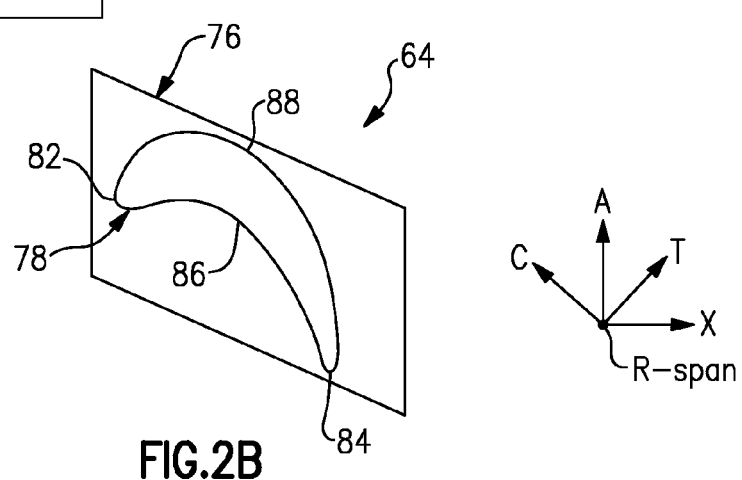
FIG. 2B is a schematic view of the blade shown in FIG. 2A illustrating various directional relationships.

Referring to FIGS. 2A and 2B, a root 74 of each turbine blade 64 is mounted to the rotor disk. The turbine blade 64 includes a platform 76, which provides the inner flow path, supported by the root 74. The root 74 includes a fir tree 73 that extends to a neck 75 beneath the platform 76. An airfoil 78, or airfoil body, extends in a radial direction R from the platform 76 to a tip 80. It should be understood that the turbine blades may be integrally formed with the rotor such that the roots are eliminated. In such a configuration, the platform is provided by the outer diameter of the rotor. The airfoil 78 provides leading and trailing edges 82, 84. The tip 80 is arranged adjacent to a blade outer air seal (not shown), which provides the outer flow path.

The airfoil 78 of FIG. 2B somewhat schematically illustrates exterior airfoil surface extending in a chord-wise direction C between a leading edge 82 to a trailing edge 84. The airfoil 78 is provided between pressure (typically concave) and suction (typically convex) wall 86, 88 in an airfoil thickness direction T, which is generally perpendicular to the chord-wise direction C. Multiple turbine blades 64 are arranged circumferentially in a circumferential direction A. The airfoil 78 extends from the platform 76 in the radial direction R, or spanwise, to the tip 80.

The airfoil 78 includes cooling passages 92 provided between the pressure and suction walls 86, 88. The exterior airfoil surface may include multiple film cooling holes (not shown) in fluid communication with the cooling passages 92. The cooling passages 92 are shown in more detail in FIGS. 3A-4B. Cooling fluid from the cooling source 90 is provided to cooling passages 92 to cool the blade 64, shown in FIG. 2A.

Referring to FIGS. 3A-4B, in one example, the cooling passages 92 include first, second, third and fourth passageways 94, 96, 98, and 100. It should be understood that other cooling passage configurations may be used than illustrated. In an example, the first passageway 94 corresponds to a leading edge passageway, and the fourth passageway 100 corresponds to a trailing edge passageway. In the example, the fourth passageway 100 includes impingement cooling holes 122 that supply cooling fluid to a trailing edge portion of the trailing edge passageway, as shown in FIG. 4A. Pedestals 120 join the pressure and suction side walls 86, 88. The second and third passageways 96, 98 correspond to intermediate passageways arranged between the leading and trailing edge passageways in the chord-wise direction C.

Returning to FIGS. 3A-3D and 4B, the passageways are separated by structural walls, for example, ribs 112a, 112b, 112c arranged in the thickness direction T, to provide rigidity to the blade to withstand high stresses during engine operation without crushing. In the illustrated example, the second passageway 96 is separated into first pressure and suction side portions 102, 104 by a chord-wise wall 110. Similarly, the third passageway 98 is separated into second pressure and suction side portions 106, 108 separated by the chord-wise wall 110. The portions 102, 104, 106, 108 provide smaller passageways that are adjacent to one another.

The ribs 112a, 112b, 112c interconnect the pressure and suction side walls 86, 88 in the thickness direction T. Although each rib is shown as a continuous structure, the rib may be somewhat discontinuous or offset, if desired.

Figure 4A:
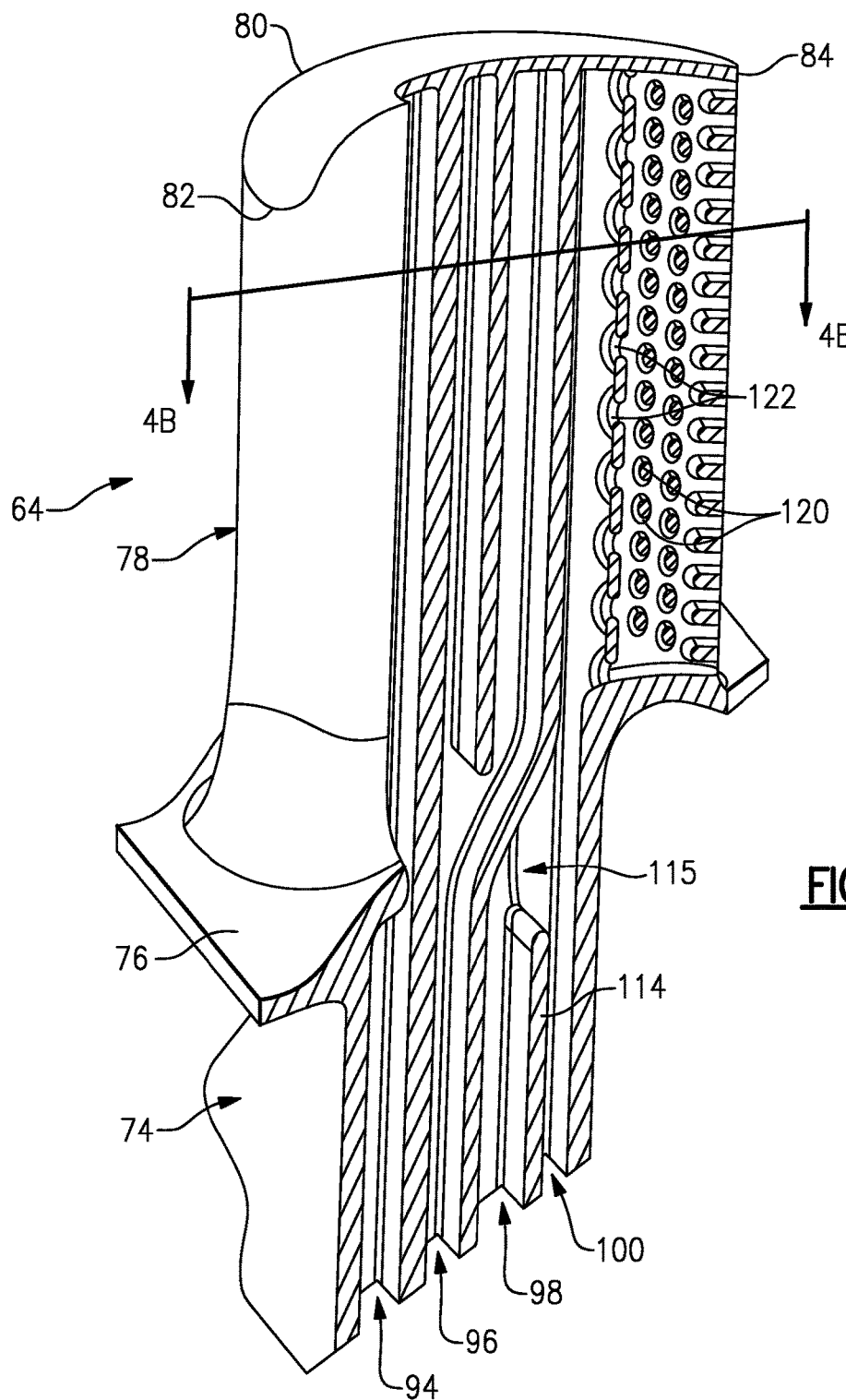
FIG. 4A is a partially broken view through the airfoil shown in FIG. 2A illustrating one example cooling passage configuration.

In the example, the rib 112c includes a rib portion 114 that is discontinued at a location along the radial direction R, best shown in FIGS. 3B, 3D and 4A, to provide an opening 115 that fluidly connects the second pressure side portion 106 to the fourth passageway 100, which distributes the cooling fluid between these passageways. In the example, the fourth passageway 100 is wider than the second pressure side portion 106. In the example, the second pressure side portion 106 is a full width in the thickness direction T. The other ribs extend radially beyond the rib portion 114, and in the example, to the tip 80. In this manner, cooling flow to the fourth passageway 100, or trailing edge passageway, is increased while maintaining sufficient structural integrity in the root 74. The opening could be provided at other locations, if desired.

Figure 5:
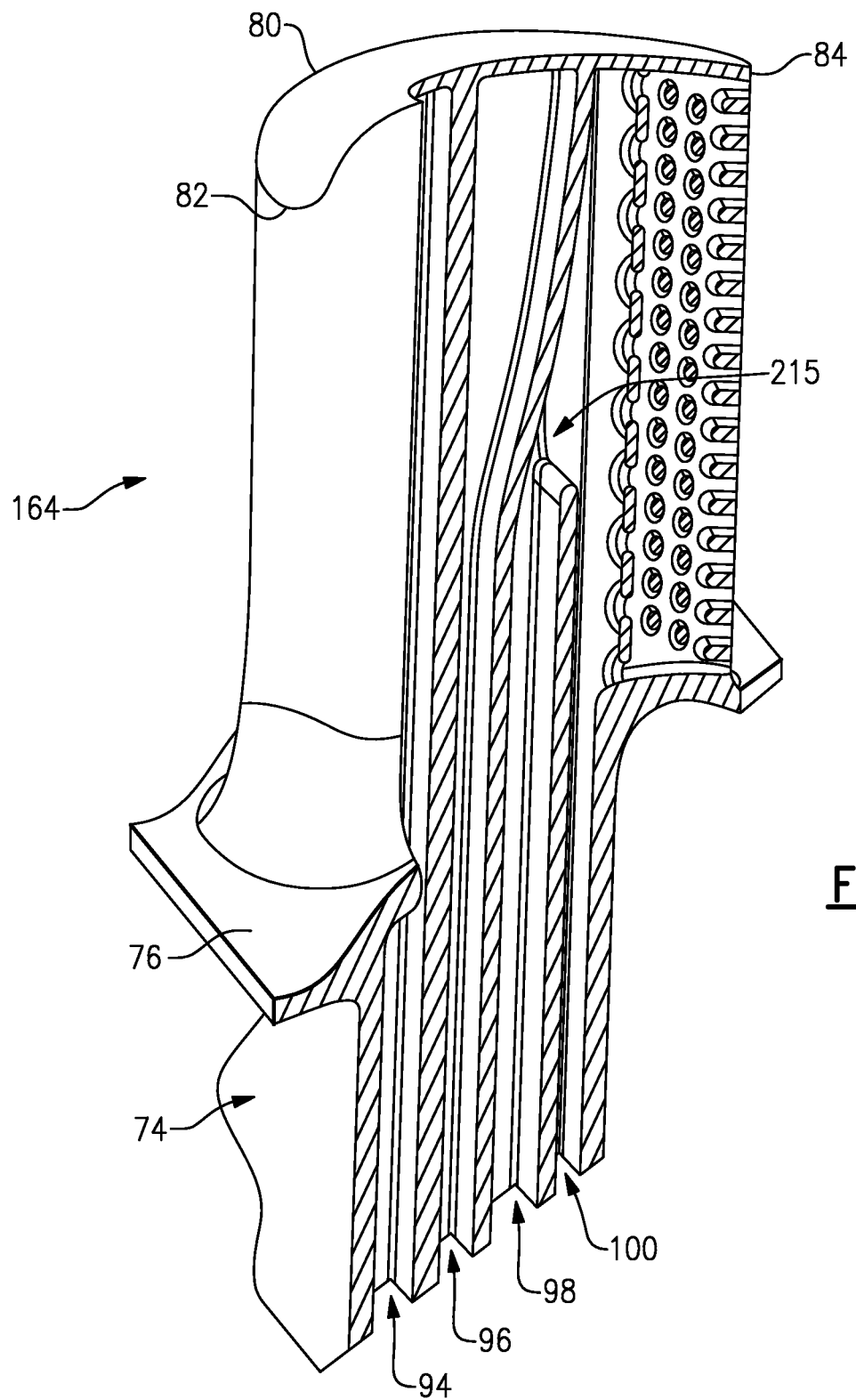
FIG. 5 is a partially broken view of another example blade illustrating another example cooling passage configuration.

The location at which the rib portion 114 ends is shown in the root 74 or neck 75 in the example of FIG. 4A. However, the location may also be provided in the airfoil 78, as shown in the blade 164 in FIG. 5. The opening 115/215 is elongated in the radial direction, and extends at least 25% of the blade radial length, in the examples shown.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. An airfoil for a gas turbine engine comprising:
an airfoil body extending in a radial direction from a support, the airfoil body having pressure and suction side walls joined at leading and trailing edges to provide an exterior airfoil surface, a chord-wise direction extending between the leading and trailing edges, and a thickness direction transverse to chord-wise direction and extending between the pressure and suction side walls, cooling passages extending from the support into the airfoil body, the cooling passages including adjacent passageways in the thickness direction and separated by a chord-wise wall, one of the adjacent passageways adjacent to another passageway in the chord-wise direction and separated by a rib in the thickness direction, the rib is discontinued at a location along the radial direction but leaving a radially extending rib portion in the thickness direction near one of the pressure and suction side walls to provide an opening that fluidly connects the one of the adjacent passageways to the other passageway such that the other passageway is wider than the one of the adjacent passageways in the thickness direction, wherein the adjacent passageways are configured to carry fluid from the root in the same direction.

2. The airfoil according to claim 1, wherein the airfoil is a blade, and the support is a root.

3. The airfoil according to claim 2, wherein the location is within the root.

4. The airfoil according to claim 2, wherein the location is within the airfoil body.

5. The airfoil according to claim 2, wherein a platform is provided between the root and the airfoil body, the location provided on a side of the platform opposite the airfoil body.

6. The airfoil according to claim 5, wherein the root includes a fir tree connected to the platform by a neck, the location provided in the neck.

7. The airfoil according to claim 1, wherein the cooling passages include a leading edge passageway, a trailing edge passageway, and multiple intermediate passageways arranged between the leading and trailing edge passageways in the chord-wise directions.

8. The airfoil according to claim 7, wherein the other passageway is the trailing edge passageway.

9. The airfoil according to claim 8, wherein the one of the adjacent passageways adjoins the pressure side wall.

10. The airfoil according to claim 7, wherein the intermediate passageways include at least two passageways, and multiple ribs extend in the thickness direction between the pressure and suction side walls to separate the at least two passageways.

11. A gas turbine engine comprising:
compressor and turbine sections; and
an airfoil in one of the compressor and turbine sections, the airfoil extending in a radial direction from a support, the airfoil body having pressure and suction side walls joined at leading and trailing edges to provide an exterior airfoil surface, a chord-wise direction extending between the leading and trailing edges, and a thickness direction transverse to chord-wise direction and extending between the pressure and suction side walls, cooling passages extending from the support into the airfoil body, the cooling passages including adjacent passageways in the thickness direction and separated by a chord-wise wall, one of the adjacent passageways adjacent to another passageway in the chord-wise direction and separated by a rib in the thickness direction, the rib is discontinued at a location along the radial direction but leaving a radially extending rib portion in the thickness direction near either the pressure side wall or the suction side wall to provide an opening that fluidly connects the one of the adjacent passageways to the other passageway such that the other passageway is wider than the one of the adjacent passageways in the thickness direction, wherein the adjacent passageways are configured to carry fluid from the root in the same direction.

12. The gas turbine engine according to claim 11, wherein the airfoil is a turbine blade, and the support is a root.

13. The gas turbine engine according to claim 12, wherein the location is within the root.

14. The gas turbine engine according to claim 12, wherein the location is within the airfoil body.

15. The gas turbine engine according to claim 12, wherein a platform is provided between the root and the airfoil body, the location provided on a side of the platform opposite the airfoil body.

16. The gas turbine engine according to claim 15, wherein the root includes a fir tree connected to the platform by a neck, the location provided in the neck.

17. The gas turbine engine according to claim 11, wherein the cooling passages include a leading edge passageway, a trailing edge passageway, and multiple intermediate passageways arranged between the leading and trailing edge passageways in the chord-wise directions.

18. The gas turbine engine according to claim 17, wherein the other passageway is the trailing edge passageway.

19. The gas turbine engine according to claim 18, wherein the one of the adjacent passageways adjoins the pressure side wall.

20. The gas turbine engine according to claim 17, wherein the intermediate passageways include at least two passageways, and multiple ribs extend in the thickness direction between the pressure and suction side walls to separate the at least two passageways.

* * * * *